July 4, 1939.  A. I. TOLLEFSON  2,164,554

WHEEL SUPPORT

Filed June 15, 1936

INVENTOR.
Adolph I. Tollefson
BY G. H. Braddock
ATTORNEY

Patented July 4, 1939

2,164,554

UNITED STATES PATENT OFFICE 2,164,554

WHEEL SUPPORT

Adolph I. Tollefson, Benson, Minn.

Application June 15, 1936, Serial No. 85,301

5 Claims. (Cl. 301—132)

This invention relates to a wheel support and has for its general object the provision of novel and improved mechanism for interchangeably applying wheels to vehicles or implements.

A further object of the invention is to provide a novel and improved wheel support by means of which a wheel carrying spindle assembly can be quickly and readily associated with and removed from a vehicle or implement.

A further object is to provide a novel and improved wheel support for a vehicle or implement which will consist of a wheel supported member, a member supporting a vehicle or implement, and complemental interengaging means upon the wheel supported member and the vehicle or implement supported member, respectively, adapted to be detachably assembled in such manner that the weight of the vehicle or implement will maintain said complemental means in interengaged relation to properly and satisfactorily mount the vehicle or implement upon carrying wheels therefor.

A further object is to provide a wheel support as set forth in the preceding paragraph, wherein a single bolt can be employed to insure that the wheel supported member and the vehicle or implement supporting member will not become disassembled by bumping or jolting movements of the vehicle or implement over the ground.

A further object is to provide a wheel support including an element permanently associated with a wheel spindle and an element permanently associated with a vehicle or implement which is to be wheel supported, as, for example, an element assembled with an axle of the vehicle or implement, said mentioned elements associated with said wheel spindle and with said vehicle or implement, respectively, being complemental and being adapted to be detachably assembled and to maintain assembled relationship by reason of the weight of the vehicle or implement.

And a further object is to provide an interchangeable wheel support wherein will be incorporated various novel and improved features and characteristics of construction.

With the above objects in view, as well as others which will appear as the specification proceeds, the invention comprises the construction, arrangement and combination of parts as now to be fully described and as hereinafter to be specifically claimed, it being understood that the disclosure herein is merely illustrative and intended in no way in a limiting sense, changes in details of construction and arrangement of parts being permissible so long as within the spirit of the invention and the scope of the claims which follow.

In the accompanying drawing forming a part of this specification,

Figure 1:
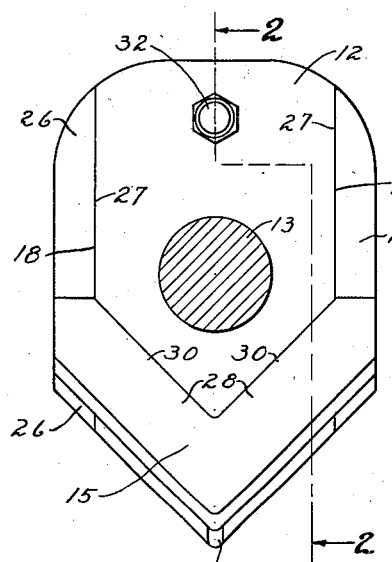
Fig. 1 is an elevational view of a wheel support including the features and characteristics of the invention.

With respect to the drawing and the numerals of reference thereon, 10 denotes a wheel supported element permanently associated with a spindle 11 for a wheel (not shown), and 12 represents a vehicle or implement supporting element permanently associated with a vehicle or implement (not shown) as by welding to an axle 13 of said vehicle or implement.

The wheel supported element 10 and the vehicle or implement supporting element 12 are complemental and are adapted to be detachably assembled with each other and to maintain assembled relationship by gravity support of the vehicle or implement by a wheel carried by the spindle 11. Said spindle and its wheel can be assembled together in any well known or preferred manner.

It will be understood that the wheel support herein presented can be employed in connection with wheeled vehicles or implements of any kind, and in practice there will be one of the wheel supports for each wheel of the vehicle or implement.

As disclosed, the wheel supported element 10 consists of a plate 14 suitably welded to the inner end of the spindle 11 and extending at right angles to said spindle, and an upwardly opening pocket or socket 15 at the lower portion of said plate 14 and at the side thereof opposite the spindle. The pocket or socket 15 is beneath the elevation of the spindle 11.

The vehicle or implement supporting element 12 consists of a plug or plate integral with one end of the axle 13 and extending at right angles to said axle.

The plug or plate 12 has opposite flat surfaces, indicated 16 and 17, respectively, and parallel opposite side edges 18, 18 which are vertically disposed. The lower portion of said plug or plate 12 includes downwardly converging edges 19, 19 which extend from the lower ends of the opposite edges 18, 18 and meet in a plane extending vertically through the midwidth of the plug or plate, and said edges 19, 19 are beveled. That is, the edges 19, 19 slant downwardly and outwardly, or in direction away from the adjacent end of the axle 13, as indicated at 20.

The plate part of the wheel supported element 10 includes a flat surface 21 opposite the spindle 11 and adapted to be engaged by the flat surface 17 of the plug or plate 12, and the pocket or socket part of said wheel supported element 10 includes a base 22 having upper surfaces 23, 23 which converge as at 24, 24 and are beveled as at 25 in the manner as described in connection with the edges 19, 19 of the plug or plate 12 so that said edges 19, 19 will seat firmly against said upper surfaces 23, 23 when the elements 10 and 12 are assembled. That is to say, the beveled surfaces 20, 20 seat against the beveled surfaces 25, 25. The wheel supported element 10 also includes vertical walls 26, 26 at the opposite sides of the upper portion of the pocket or socket 15 and at the opposite sides of the plate 14 and opposite the spindle 11. Said vertical walls 26, 26 provide vertical parallel surfaces 27, 27 which are contiguous with the opposite edges 18, 18 of the plug or plate 12 when the elements 10 and 12 are assembled.

Figure 2:
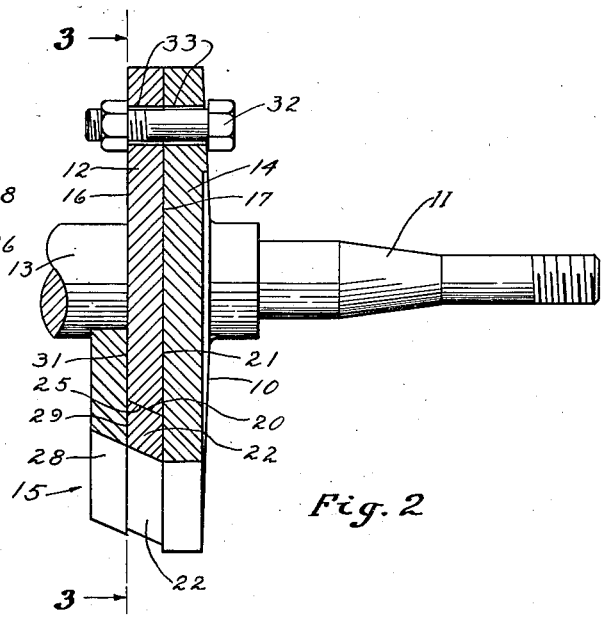
Fig. 2 is a sectional view taken on line 2—2 in Fig. 1.
Figure 3:
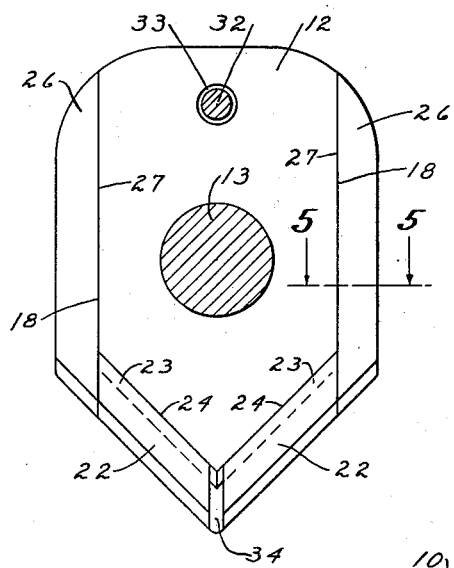
Fig. 3 is a sectional view taken as on line 3—3 in Fig. 2.
Figure 4:
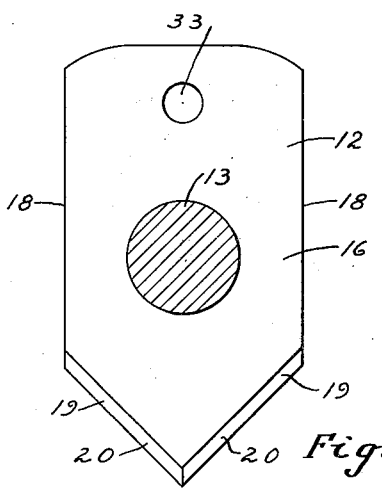
Fig. 4 is an elevational view of the vehicle supporting element removed from the wheel supported element of the wheel support.

A cross piece 28 of general V-shape completes the pocket or socket 15. Said cross piece 28 includes a surface 29 thereof suitably secured to the adjacent surface of the base 22 and upstanding portions 30, 30 extending above said base 22. The portions 30, 30 converge at the same angle as do the surfaces 23, 23 and the upper edge of each portion 30 is parallel with the surface 23 just beneath it. Said portions 30, 30 provide a flat surface or surfaces 31 in contiguous relation with the lower portion of the surface 16 of the element 12 when the elements 10 and 12 are assembled. See Fig. 2. The cross piece 28 extends the full width of the element 10 as disclosed in Fig. 1. At the locations of the walls 26, 26 the upper portions of the cross piece 28 are horizontal.

Figure 5:
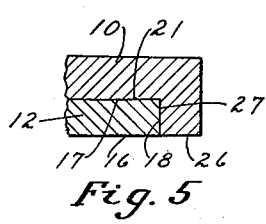
Fig. 5 is a sectional view taken on line 5—5 in Fig. 3.

It will be evident that the base 22 of the pocket or socket 15 and the upper surfaces of said base 22 have width substantially equal to the thickness of the plug or plate 12 and to the width of the edges 19, 19 of said plug or plate. Also, the vertical surfaces 27, 27 of the walls 26, 26 upon the element 10 are spaced apart to snugly receive the element 12 between said surfaces when said element 12 is assembled with the pocket or socket 15, with the opposite edges 18, 18 of the element 12 in engagement with said vertical surfaces 27, 27. See Fig. 5.

To assemble the elements 10 and 12, said element 12 is first placed adjacent the pocket or socket 15 of said element 10 and then inserted into said pocket or socket. To disassemble the elements 10 and 12, said element 12 is lifted out of said pocket or socket 15. A headed and nutted bolt 32 loosely arranged in openings 33 in upper portions of the plug or plate 12 and the plate 14 may constitute means for precluding disassembly of the elements 10 and 12 by bumping or jolting movements of the vehicle or implement over the ground. In some cases, a headed and nutted bolt such as 32 may constitute an essential part of the wheel support. An outlet 34 through the lower portion of the base 22 is for the obvious purpose of releasing dirt from the pocket or socket 15.

The lower or pocket or socket portion of the element 10 desirably has greater weight than the upper portion of said element 10 so that the pocket or socket 15 will open vertically upward when the elements 10 and 12 are disassembled. Thus the unit including the spindle 11 with wheel and the element 10 can readily be moved to position so that the surface 21 is engaged by the surface 17, with the element 12 directly above the pocket or socket 15, and the vehicle or implement lowered to drop said element 12 into said pocket or socket. Ordinarily, the vehicle or implement to be provided with wheels will be upon jacks or other supports and at elevation somewhat above the wheel spindles. The bolt holes 33 are of course in alinement when the element 12 is seated in the element 10.

It will be evident that the weight of a vehicle upon wheels carried by spindles such as 11 having elements such as 10 interengaged with elements such as 12, in the manner as set forth, will cause the elements such as 12 to be tightly seated in pockets or sockets such as 15, and will also cause the adjacent surfaces such as 21 and 17 of elements such as 10 and 12 to be in pressing engagement. That is to say, the load will insure the interengagement of elements such as 10 and 12 and will exert its pressure to maintain the plug or plate 12 and the plate 14 in firm engagement. The pressure of the load will be directed mainly toward the side of the pocket or socket 15 adjacent the plate 14.

A wheel support made according to the invention can be employed on either side of a vehicle or implement, at front, rear, or intermediate location thereof. The interengagement of the surfaces 18, 27 and 18, 27 and 19, 23 and 19, 23 and the beveled surfaces 20, 25 and 20, 25 always insures a tight fit. Should any of the surfaces 19, 20, 23, 25 become worn in use, the weight of the vehicle or implement will yet insure a tight fit by maintaining the surfaces 19, 20 of the element 12 in firm engagement with the surfaces 23, 25 of the base 22. By reason of the pocket or socket 15 having downwardly converging bottom and element 12 having downwardly converging lower portion, said element 12 will always seat in the bottom of said pocket or socket 15 in spite of wear. By reason of the interengaging beveled surfaces 20 and 25, the element 12 is gravity held against the surface 21 with very little if any pressure against the cross piece 28 or the bolt 32. The loose fit of said bolt is of course to allow the element 12 to settle itself in the pocket or socket 15 as parts become worn. Clearly, the bolt is unnecessary except to insure that the element 12 will not become accidentally displaced, by upward movement against the load, from the pocket or socket of the element 10. As the load is hauled, in either direction, relative movement between the elements 10 and 12 is precluded by interengagement of the surfaces 18, 27 and 19, 23, as will be obvious.

In some instances when an axle such as 13 is to have rotation, a bolt or bolts such as 32 will be employed as a positive connecting means of the wheel support, it being evident that save for a tight connection at the location of the bolt the elements 10 and 12 would become disconnected were the wheel support itself turned upside down.

It should be remarked that while the description herein is of a pocket or socket 15 and an element 12 having explicitly recited structure, the complemental interengaging means of the wheel support can, plainly, be of variant construction. For example, the receiving means for the element 12 need not necessarily be a complete pocket or socket. Any equivalent satisfactory arrangement could be substituted. In some instances it may be desirable to carry the so-called pocket or socket member, or equivalent, upon the vehicle or implement and the so-called male element upon the wheel spindle.

The wheel support of the invention can be referred to as a quick change spindle assembly. The interchange of wheels can evidently be very easily made. The device does not require grease and is clean.

By employment of the principle of the invention a single set of rubber tired wheels can serve a number of different vehicles and implements. Thus large savings can be effected. The hubs and ball or roller bearings of interchangeable wheels or rims are expensive. Many vehicles and implements are used for only a few days each year. It is desirable to have wheeled vehicles and implements rubber equipped both to eliminate vibration and for tight draft. That rubber deteriorates considerably when out of use is well known. The quickly and readily interchangeable and practical wheel support of the invention makes provision for use of rubber equipped vehicles or implements with but a minimum of rubber subjected to deterioration during slack seasons. Said wheel support also makes provision for cutting the initial expense of equipping vehicles and implements with rubber by rendering one set of rubber wheels sufficient for a plurality of vehicles and implements. The wheel support is of course usable with wheels of any character, whether or not rubber equipped.

What is claimed is:

1. A wheel support comprising a first element to be associated with a wheel spindle and a second element to be associated with a vehicle to be wheel supported, said first element including a plate member disposed substantially in right-angle relation to said wheel spindle and having an upwardly opening pocket at the side of the plate member opposite said wheel spindle and below its longitudinal axis, said second element including a plug member adapted to be removably received in said pocket, said pocket being defined at its lower portion by a base member, at one of its sides by a surface of said plate member above said base member and at its opposite side by a member rigid with and spaced from the plate member in the plane thereof, and said plug member being adapted to lie freely in said pocket against said base member with outer and inner surfaces of the plug member between said plate member and said rigid member in proximate relation to the last mentioned members, respectively.

2. A wheel support comprising a first element to be associated with a wheel spindle and a second element to be associated with a vehicle which is to be wheel supported, said first element including a plate member disposed substantially in right-angle relation to said wheel spindle and having an upwardly opening pocket at the side of said plate member opposite said wheel spindle and below its longitudinal axis, said second element including a plug member adapted to be removably received in said pocket, said pocket being defined at its lower portion by a base member having downwardly converging surfaces, at its outer side by a surface of said plate member above said base member and at its inner side by a member rigid with and spaced from the plate member in the plane thereof, and said plug member having downwardly converging surfaces and being adapted to lie freely in said pocket with the outer and inner surfaces of the plug member between said plate member and said rigid member in proximate relation to the last mentioned members, respectively, with said downwardly converging surfaces of the plug member against the downwardly converging surfaces of said base member.

3. The combination as specified in claim 2, and means in spaced relation to said pocket for detachably connecting said plate member and said plug member to each other.

4. The combination as specified in claim 2, wherein the converging, engaging surfaces of said plug member and said base member, respectively, slant obliquely in direction longitudinally of said wheel spindle.

5. The combination as specified in claim 2, and members upon said plate member above said pocket at the opposite edges of and in engagement with said plug member when in said pocket.

ADOLPH I. TOLLEFSON.